E. S. BOTTOMLY.
VEHICLE WHEEL.
APPLICATION FILED APR. 27, 1911.

1,006,055.

Patented Oct. 17, 1911.

2 SHEETS—SHEET 1.

WITNESSES

INVENTOR
Edward S. Bottomly
Attorneys

E. S. BOTTOMLY.
VEHICLE WHEEL.
APPLICATION FILED APR. 27, 1911.
1,006,055.
Patented Oct. 17, 1911.
2 SHEETS—SHEET 2.
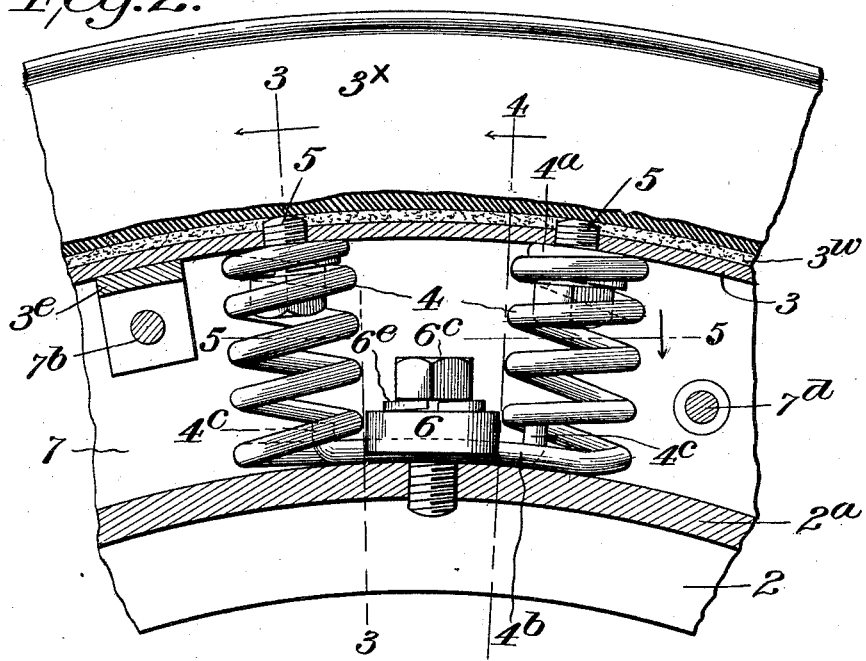
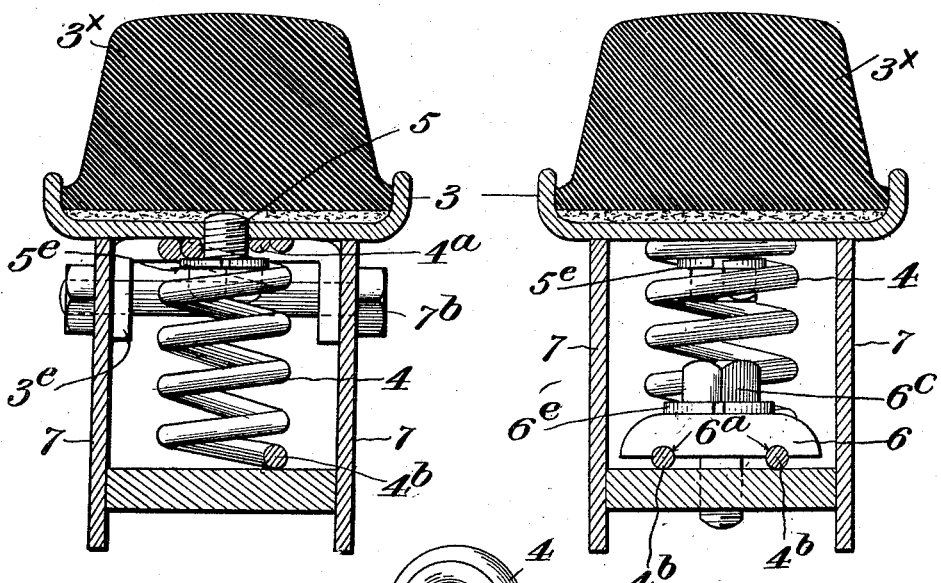
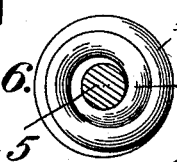
WITNESSES
C. N. Walker
L. E. Witham
INVENTOR
Edward S. Bottomly
Alexander Powell
Attorneys

UNITED STATES PATENT OFFICE.

EDWARD S. BOTTOMLY, OF MARTINSBURG, WEST VIRGINIA, ASSIGNOR TO THE WALK AUTO TIRE COMPANY, OF MARTINSBURG, WEST VIRGINIA, A CORPORATION OF DELAWARE.

VEHICLE-WHEEL.

1,006,055.        Specification of Letters Patent.     Patented Oct. 17, 1911.

Application filed April 27, 1911. Serial No. 623,746.

*To all whom it may concern:*

Be it known that I, EDWARD S. BOTTOMLY, of Martinsburg, in the county of Berkeley and State of West Virginia, have invented certain new and useful Improvements in Vehicle-Wheels; and I hereby declare that the following is a full, clear, and exact description thereof, reference being had to the accompanying drawings, which form part of this specification.

This invention is an improvement in spring wheels especially designed for use on automobiles and to do away with the need for pneumatic and cushion-tires now commonly employed. Its object is to provide a wheel which will have all the desirable resilient properties of a pneumatic-tired wheel,—as regards capability of absorbing shock and jars incident to the passage of the vehicle over roads and rough places,— and will excel pneumatic and cushion tired wheels in points of durability, cost of maintenance, and general efficiency.

The invention in particular is an improvement upon the wheel shown in the patent to G. W. Walk No. 848,142, dated March 26, 1907; and has particular reference to the novel construction of,—and means for attaching,—the cushioning springs between the rim of the spoked wheel and the felly, or outer floating rim, of such wheel.

I will describe the invention with reference to the accompanying drawings which illustrate a wheel of the general type shown in said Walk patent, containing the novel features embodying my invention.

Figure 1:
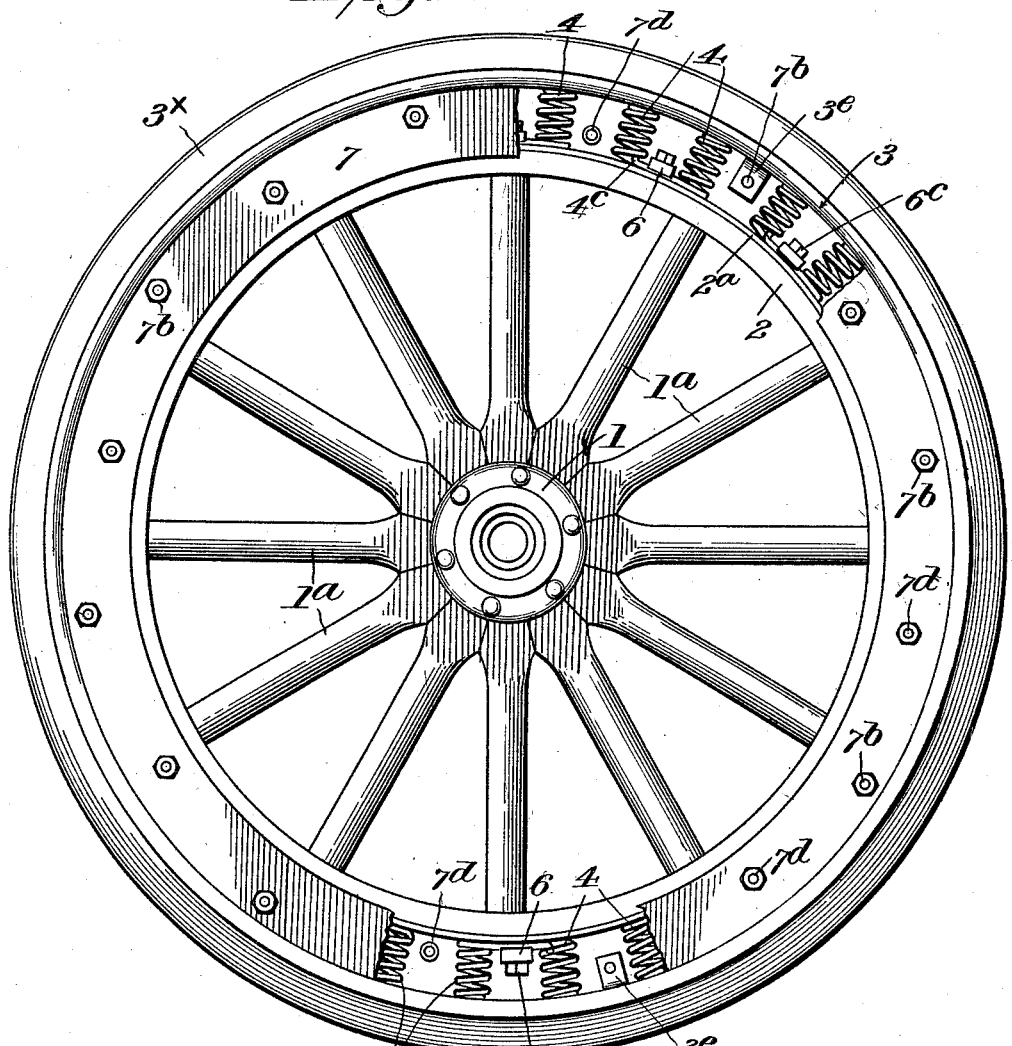
Figure 5:
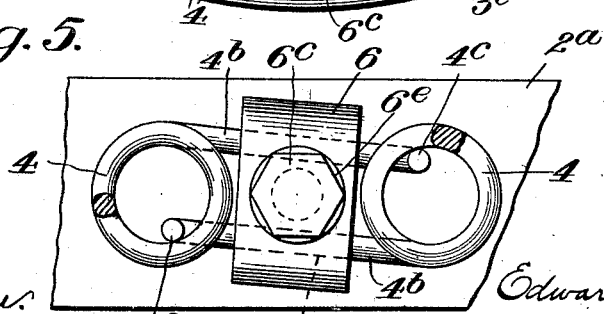

In said drawings—Figure 1 is a side elevation of a vehicle wheel, parts of one of the annular side-plates of such wheel being broken away to show the arrangement of the cushioning springs. Fig. 2 is an enlarged detail sectional view of such wheel. Fig. 3 is a section on line 3—3, Fig. 2. Fig. 4 is a section on line 4—4, Fig. 2. Fig. 5 is a section on line 5—5, Fig. 2. Fig. 6 is a detail end view of one of the springs.

The wheel center may be of any suitable construction; as shown it has a hub 1 connected by spokes $1^a$ to the rim 2, which may be of wood encircled by a band $2^a$, preferably of steel. Surrounding the wheel concentric with the rim band 2 but spaced therefrom is the felly portion of the wheel, comprising an annular channeled iron plate 3 which is of larger internal diameter than the external diameter of the rim 2. Between the rim 2 and felly 3 are inserted radially disposed helical springs 4 arranged in pairs. As shown each spring 4 is preferably made of rod metal coiled into spiral form and having its outermost end coil contracted and flattened as shown at $4^a$, so that the outer end of such spring 4 can be confined to the felly 3 by means of a bolt 5, preferably having its shank inserted through the opening in the contracted coil $4^a$ of the spring 4 and tapped into a threaded hole in the felly 3.

The inner end, or bottom, of each spring 4, is provided with a tangentially extending portion $4^b$ which is preferably curved as indicated in Figs. 1 and 2, so as to fit neatly upon the outer surface of the rim-plate $2^a$; and the extremity of this extension $4^b$ is upturned forming a lug $4^c$. The two springs 4 in each pair are arranged with their extensions $4^b$ lying parallel and extending from one spring to the other, so that the end of the extension $4^b$ of one spring forms a support for one side of the lower or inner coil of the related spring in the pair, and the lug $4^c$ on said extension helps to retain the bottom coil of the related spring in position. The parallel extensions $4^b$ of the springs in each pair lie parallel upon the periphery of the rim and are preferably secured to the rim plate $2^a$ by means of interposed clamp-plates 6, each arranged transversely of the rim-plate and overlying the parallel extensions $4^b$ of the adjacent related springs in each pair. Said clamp-plates 6 are preferably grooved on their under sides as indicated at $6^a$, to engage the members $4^b$ of the springs and hold them parallel and in exact position. Each clamp-plate 6 is rigidly secured to the rim by suitable fastenings; preferably by means of a bolt $6^c$ passed through a central opening in the clamp-plate and having its threaded shank tapped into a threaded hole in the rim-plate $2^a$ as shown. The clamp-plates 6 are preferably of such width that they will keep the lowermost coils of the adjacent springs 4 in each pair properly spaced apart; therefore, these springs cannot move toward each other, and they cannot move apart because the lugs $4^c$ on the ends of the extensions $4^b$ of such springs prevent the springs separating or moving apart circumferentially of the rim or felly.

Each spring in each pair is securely fastened at its outer end to the felly 3, by bolt 5 and its inner end is secured to the rim by the clamp 6. While I at present prefer to use tap bolts 5 and 6 to secure the springs 4 to the felly and rim as described, the invention is not restricted to these particular devices for fastening the springs to the felly and rim. If the springs are secured to the felly by tap bolts as shown, I preferably employ spring locking washers $5^e$ under the heads of the bolts, as indicated in the drawings, in order to prevent the bolts loosening by reason of jar. Similar locking washers $6^e$ may be placed under the heads of the bolts $6^c$.

It will be seen by reference to Fig. 3 that each spring has a solid flat bearing at its outer end against the inner side of the felly 3 and each spring has a long bearing at its inner side or bottom against the rim by means of its extension $4^b$; and it also has a further bearing upon the rim by resting upon the extension $4^b$ of the related spring. This manner of attaching the springs overcomes the tendency of the springs to tilt laterally when compressed, and the springs in each pair are retained in true radial position in the wheel.

The springs 4 constructed and connected to the rim and felly as described, are double acting: that is, they support and hold the wheel center in the felly both by compression and extension. The springs 4 are made of a predetermined normal length, and resist either compression or extension; therefore, any weight upon the axle of the wheel is transmitted to the felly by compression of the lower springs and extension of the upper springs; and while the greatest load is borne by the springs in vertical alinement with the axle, practically every spring in the wheel comes into play, either by extension or compression or by lateral flexion, and assists in carrying the load and in resisting any tendency of weight upon the axle, or shock or blow upon the felly, to displace the wheel center eccentrically to the felly, or vice versa.

The springs 4 are preferably inclosed between annular side-plates 7. Such plates are not essential, but they give the wheel a neater appearance, and exclude dirt and mud from the springs. As shown these annular side-plates may be connected to the felly by means of bolts $7^b$ transfixing the annular plates 7 on opposite sides of the felly and rim. Said bolts are passed through U-shaped bracket-irons $3^e$ bolted or riveted to the inner side of the felly 3, see Fig. 3. These brackets $3^e$ are preferably made long enough to serve as spacers to hold the side-plates the desired distance apart, yet allow them to be bolted rigidly to the brackets. If desired spacing bolts $7^d$ may be interposed between the side-plates 7 at points intermediate the brackets $3^e$, and secured by nuts on the outer ends of the bolts as indicated in Fig. 1. Thus, the annular plates are rigidly attached to the felly and have a close sliding contact with the sides of the wheel rim but do not interfere with the eccentric displacement or movement of the wheel center relative to the felly, or vice versa.

The felly may, if desired, be provided with a tire of any suitable kind, preferably I use a solid rubber tire $3^x$ to reduce noise and lessen the jars, although such a tire is not an essential part of the wheel. A band $3^w$ of asbestos or other suitable non-heat conducting material may be placed between the rubber tire $3^x$ and the felly 3, to prevent injury to the rubber tire by friction or direct contact with the metal of the felly.

What I claim is:

1. In a wheel, the combination of a wheel center having a rim, a felly of larger internal diameter than the external diameter of the rim, and pairs of spiral springs interposed between the felly and the rim, each spring having a contracted outer end and a projection on its lower end extending toward and under the adjacent spring in the pair, and provided with a lug on its extremity to assist in positioning such spring; with a clamp plate interposed between the springs in each pair and engaging the extensions of both springs, a bolt for securing said clamp plate rigidly to the rim, and bolts passed axially through the outer coil of each spiral spring and securing the same to the felly.

2. A wheel comprising a wheel center and rim, a felly, a series of pairs of springs interposed between the rim and felly, each spring in each pair having an extension at bottom extending to and under the adjacent spring in the pair and adapted to support one side of such spring and prevent tilting thereof, means for attaching the outer end of each spring to the felly, and means for securing the extensions of both springs to the rim.

3. In combination, a wheel center and rim, a felly, a series of pairs of helical springs interposed between the rim and felly, each spring in each pair having an extension at bottom extending to and under the adjacent spring in the pair and supporting one side of such spring, means for attaching the outer end of each spring to the felly, a clamp plate interposed between the springs in each pair and engaging the extensions of both springs, and means for securing the clamp plates to the rim.

4. A wheel comprising a wheel center having a rim, a felly of larger diameter than the rim, a series of helical springs interposed between the rim and felly and arranged in pairs, each spring having a contracted outer end for engagement of a bolt, and an extension on its lower end extending to and under the adjacent spring and having a lug on its extremity engaging such spring and assisting in retaining such spring in position, a bolt securing each spring to the felly, and means interposed between the springs and engaging the extensions of both springs in a pair to fasten such springs to the rim.

5. In a wheel, the combination of a wheel center having a rim, a felly of larger diameter than the rim, a series of radially disposed helical springs interposed between the rim and felly and arranged in pairs, each spring having a contracted outer end, and an extension on its lower end extending to and under the adjacent spring to prevent tilting thereof, and having a lug on its extremity assisting in retaining such related spring in position, a bolt engaging the contracted outer end of each spring and securing it to the felly, and a clamp plate interposed between and separating the springs and engaging the extensions of both springs to hold the springs in position.

6. A wheel comprising a wheel center having a rim, a felly of larger internal diameter than the external diameter of the rim, and series of pairs of radially disposed helical springs interposed between the felly and the rim, each spring in each pair having a contracted coil on its outer end and a projection on its lower end extending toward and under the adjacent spring in the pair, a clamp plate interposed between the springs in each pair and engaging the extensions of both springs, a bolt for securing said clamp plate rigidly to the rim, and a bolt passed axially through the outer coil of each spiral spring and securing the same to the felly.

In testimony that I claim the foregoing as my own, I affix my signature in presence of two witnesses.

EDWARD S. BOTTOMLY.

Witnesses:
  FRANK J. TRAMMELL,
  HAMMOND HUNTER.

Copies of this patent may be obtained for five cents each, by addressing the "Commissioner of Patents, Washington, D. C."